Patented Apr. 30, 1929.

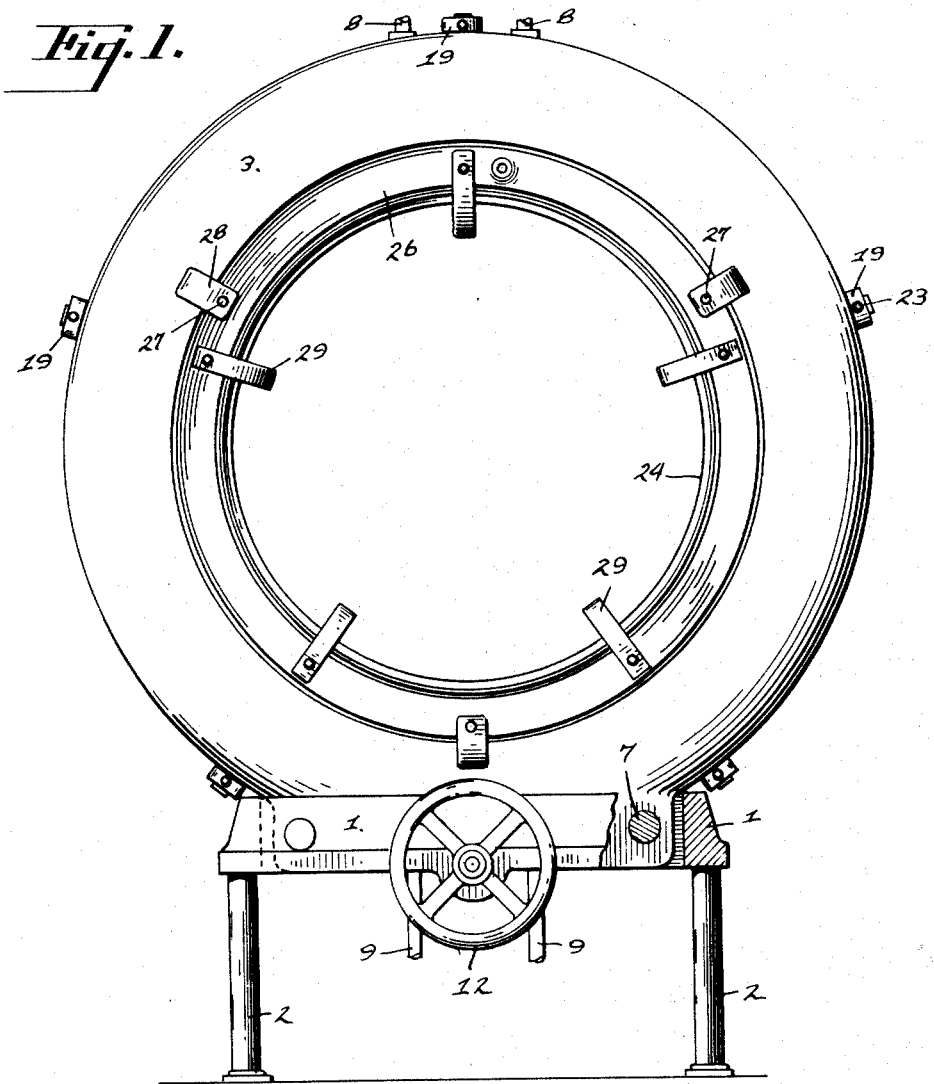
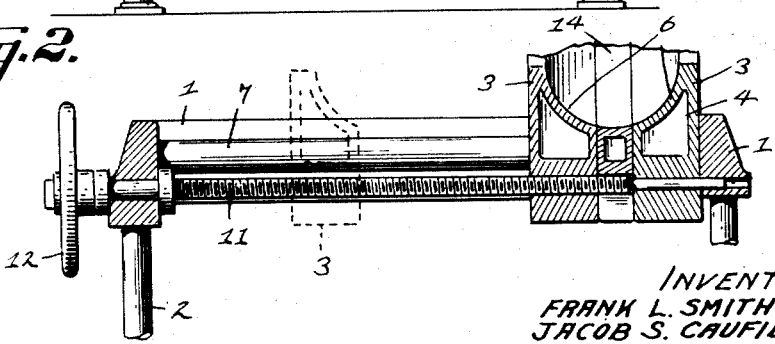

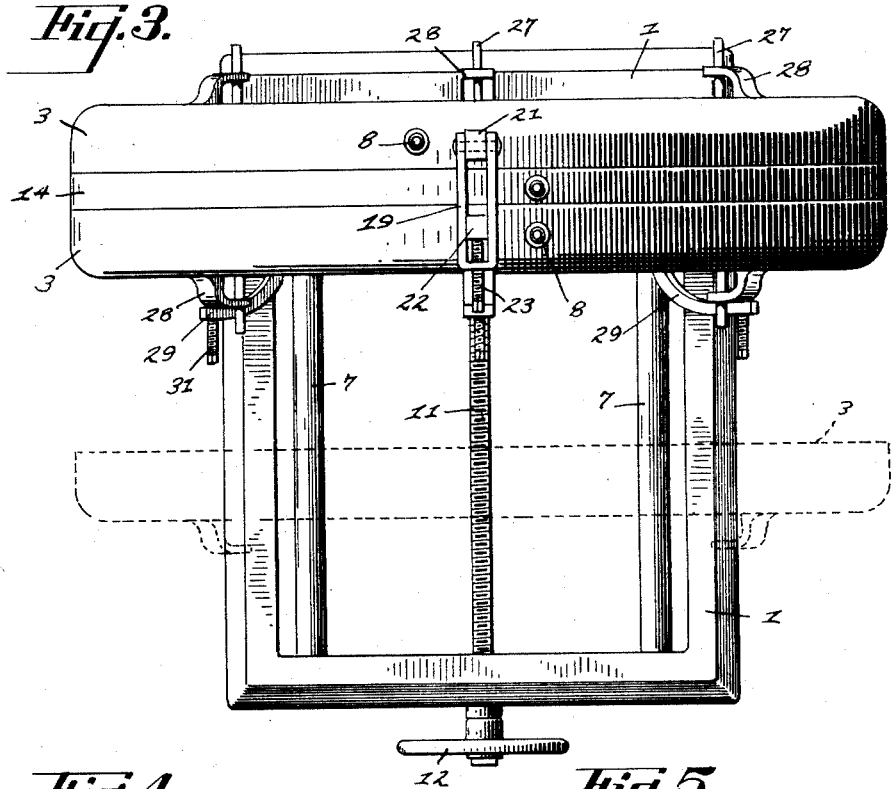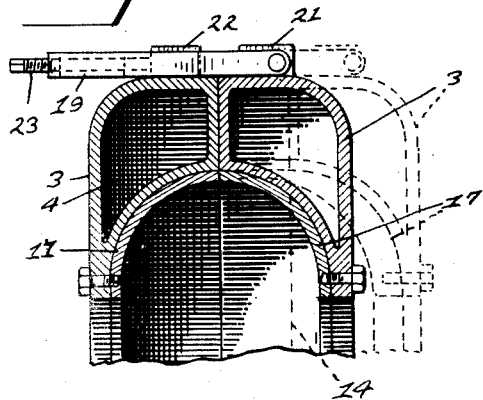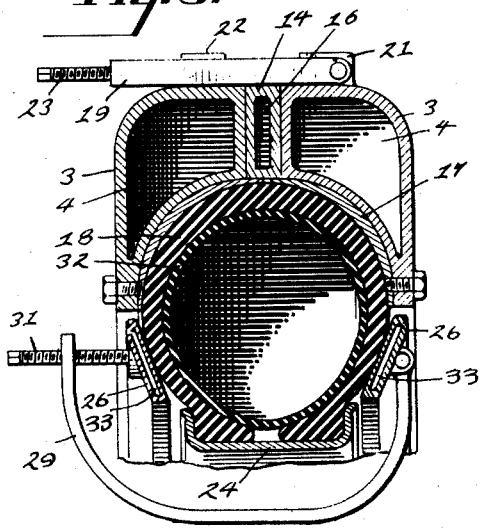

1,710,804

UNITED STATES PATENT OFFICE.

FRANK L. SMITH, JACOB S. CAUFIELD, AND CHARLES J. PETERSON, OF SACRAMENTO, CALIFORNIA, ASSIGNORS TO THE SUPER MOULD COMPANY, OF RENO, NEVADA, A CORPORATION.

TIRE-RETREADING MOLD.

Application filed April 14, 1927. Serial No. 183,742.

Our invention relates to improvements in tire retreading molds for automobile tires wherein a single mold is made adjustable to all ordinary sizes of pneumatic tires.

The present invention is directed to improvements upon the device disclosed in our co-pending application, Serial No. 153,272, filed December 8, 1926, the primary object being to provide an improved mold having a wider range of adjustability, and adapted to be used with all ordinary sizes of tires.

Another object is to provide an improved mold having increased strength and stability, and in which an accurate alinement and matching of sections is maintained.

A further object is to provide improved means for adjusting the mold to various sizes of tires.

Another object is to provide a device wherein matching annular sections are arranged to be moved axially apart to facilitate the placing and removing of a tire from the mold, and to permit the introduction of an auxiliary ring adapted to increase the width of the mold.

A still further object is to provide an improved device of the character described provided with improved means for compressing and expanding tires of various size within the mold.

We accomplish these and other objects by means of the improved device disclosed in the drawings forming a part of the present application wherein like characters of reference are used to designate similar parts throughout the specification and drawings, and in which, Fig. 1 is a front elevation of our improved tire retreading mold.

Fig. 2 is a broken transverse section showing the mold separating means.

Fig. 3 is a plan view of the mold.

Fig. 4 is a broken sectional view of the mold, indicating the manner in which it may be widened for large size tires, and Fig. 5 is a broken sectional view showing the manner in which a tire is expanded within the mold.

Referring to the drawings, the numeral 1 is used to designate in general a frame supported upon suitable supporting legs 2. A pair of matching annular mold sections 3 are mounted upon the frame, said sections having steam chambers 4 formed therein and provided with oppositely disposed concave surfaces 6 arranged to receive a tire. One of the sections 3 is secured adjacent the back of the frame 1 while the other section 3 is slidably mounted upon a pair of guides 7 extending from the back to the front of the frame. Steam connections 8 are provided in the top portions of the sections 3 for introducing steam into the chambers 4, and drain connections 9 are provided in the bottoms of the sections for draining off water condensed from the steam.

A threaded shaft 11 extends from the front to the back of the frame 1, said shaft being threaded into engagement with the slidable section 3 whereby said section may be moved along the guides 7 axially with respect to the stationary section. A hand wheel 12 or other suitable turning device is mounted upon the forward end of the shaft 11 whereby said shaft may be easily rotated to move the slidable section 3.

In order to increase the width of the mold, an auxiliary mold ring 14 is provided, said ring being arranged to be engaged between the ring sections 3 in matching relation thereto. For each complete mold, a plurality of rings 14 of various widths are provided so that when assembled between the sections 3 a desired width may be obtained. The rings 14 have steam chambers 16 formed therein to permit steam to be circulated therethrough in the same manner as the sections 3.

A matrix 17 is fitted within the mold to form a molding surface conforming to the surface of a tire 18 to be retreaded. A matrix is designed to fit each particular size of tire, the inner surfaces being designed to fit the treads of specified sizes of tires while the outer surfaces of each matrix is designed to seat within the mold when adjusted to the necessary width by inserting the proper ring 14. The matrices are made in matching sections adapted to be fitted within the matching sections 3 whereby the matrix may be readily assembled into the mold to receive the tire.

Clamping yokes 19 are pivotally mounted upon lugs 21 formed upon the stationary mold section 3. The yokes are made of sufficient length to extend forwardly over lugs 22 formed upon the slidable mold section when the sections are spaced by the largest ring 14. Members 23 are threaded through the ends of the yokes 19 and are arranged to be advanced against the lugs 22 to compress the sections 3 tightly together or against opposite sides of a ring 14 therebetween.

In operation, the slidable section is moved away from the stationary section 3 of the mold to a position such as indicated in dotted lines in Fig. 3 of the drawings. The proper ring 14 and matrix 17 adapted to accommodate the mold to the particular tire to be retreaded is selected and placed in position within the section 3. The tire, treated as in the ordinary retreading process, is then introduced into the mold and the slidable section moved into operative position as shown in full lines in Fig. 3, the yokes 19 being then moved over the lugs 22 and the members 23 tightened to compress the sections 3 tightly together.

The tire 18 is mounted upon an ordinary tire rim 24 before it is placed in the mold. After the mold has been clamped in operative relation around the tire, the tire is expanded against the inner surface of the matrix 17 by means of a pair of annular rings 26 engaging opposite sides of the tire between the rim 24 and the edge of the adjacent mold section. The rings 26 are provided with guide pins 27 slidably engaging brackets 28 formed upon the sides of the mold sections 3. Yokes 29 are pivotally mounted upon one of the rings 26, said yokes extending through the rim 24 to a point opposite the opposite ring 29. Threaded rods 31 are threaded through the ends of the yoke and arranged to engage the opposite ring 29 whereby said rings may be moved toward each other and thereby compress the sides of the tire casing inwardly against a partially inflated inner tube 32 within the tire, this compressing of the tire causing the tread to be expanded into firm contact with the interior of the matrix around the entire mold. The yokes are made sufficiently wide to permit operative engagment with the rings 29 when the mold is extended to its widest operative size.

Steam is introduced into the section 3 and a ring 8 when required, to carry out the retreading process in the ordinary manner.

From the above explanation it will be seen that by a proper selection of rings 14 and matrix 17 the single mold can be adjusted to accommodate any ordinary size of tire. This avoids any expensive duplication of equipment and affords a simple and efficient means for retreading tires of all common sizes with a minimum of expense and equipment.

While we have illustrated and described what we now regard as the preferred embodiment of our invention, the device is, of course, subject to modifications in numerous ways without departing from the spirit of our invention. We, therefore, do not wish to restrict ourselves to the particular form of construction illustrated and described, but desire to avail ourselves of all modifications which may fall within the scope of the appended claims.

If desired, steam chambers 33 may be formed in the pressure rings 26 as shown in Fig. 5 of the drawings, whereby steam may be circulated through said plates for heating the side walls of the tires when desired.

Having thus described our invention what we claim as new and desire to secure by Letters Patent is.

1. A tire retreading mold comprising a pair of matching annular sections having steam chambers formed therein and arranged to receive a tire therebetween; means for moving the sections axially apart to admit a tire therebetween; a pair of rings arranged to engage opposite side walls of the tire; and means carried by one of said rings and arranged to engage the opposite ring to compress the rings against the tire to expand the tire within the mold.

2. A tire retreading mold comprising a pair of matching annular sections; means for moving one section axially with respect to the other section; means for adjusting the mold to various sizes of tires; a pair of rings arranged to engage the sides of a tire inserted in the mold for retreading; and means carried by one of said rings and arranged to engage the opposite ring for compressing said rings against the tire to expand said tire within the mold.

3. A tire retreading mold comprising a pair of matching annular sections; a pair of pressure rings arranged to engage the sides of a tire inserted into the mold for retreading, said rings having steam chambers therein to permit steam to be circulated therethrough; and means for moving said rings inwardly to compress the walls of the tire together and expand the tire within the mold.

4. A tire retreading mold comprising a pair of matching annular sections arranged to receive a tire therebetween; a pair of pressure rings arranged to engage the sides of a tire inserted in the mold; and means carried by one of the rings and arranged to engage the opposite ring to compress the walls of the tire together and expand the tire within the mold.

5. A tire retreading mold comprising a pair of matching annular sections arranged to receive a tire therebetween; a pair of pressure rings arranged to engage the sides of a tire inserted in the mold; and means carried by one of the rings and arranged to engage the opposite ring to compress the walls of the tire together and expand the tire within the mold; and means for adjusting the mold to various sizes of tires.

In witness whereof we hereunto subscribe our signatures.

F. L. SMITH.
J. S. CAUFIELD.
CHARLES J. PETERSON.